United States Patent [19]

Spahn

[11] 3,992,899
[45] Nov. 23, 1976

[54] DEVICE FOR COOLING BULK MATERIAL BY LOW-BOILING LIQUEFIED GAS
[75] Inventor: Walter Spahn, Frankfurt am Main, Germany
[73] Assignee: Messer Griesheim GmbH, Frankfurt am Main, Germany
[22] Filed: May 1, 1975
[21] Appl. No.: 573,754

[30] Foreign Application Priority Data
May 31, 1974 Germany............................ 2426459
Oct. 8, 1974 Germany............................ 2447838

[52] U.S. Cl. .................................. 62/374; 62/381; 134/134; 165/89; 241/17; 241/23; 259/3; 259/89; 259/DIG. 24
[51] Int. Cl.² ........................................ F25D 17/02
[58] Field of Search ............ 241/17, 23, 284; 62/63, 62/374, 266, 380, 381; 34/108, 130, 134; 165/89; 259/DIG. 24, 3, 89; 134/134

[56] References Cited
UNITED STATES PATENTS
3,015,219  1/1962  Veyrie ................................ 62/63 X
3,213,634  10/1965 Granata ............................. 62/381 X
3,395,549  8/1968  Grimes .............................. 62/381 X
3,906,743  9/1975  Schorsch et al. ................. 62/381 X Primary Examiner—William F. O'Dea
Assistant Examiner—Ronald C. Capossela
Attorney, Agent, or Firm—Connolly and Hutz

[57] ABSTRACT

A device for cooling bulk material by low-boiling liquefied gas includes a precooling zone and a spraying zone. The precooling zone is inclined from the horizontal downwardly toward its discharge end to which is attached a rotatable drum-shaped chamber as its spraying and draining zone which is constructed as a worm conveyor. Where used for scrap tires, a spray pipe is provided at the discharge end with a ring mounted on the internal wall between the spray orifices and the discharge opening, the ring having a thickness corresponding to the average tire thickness.

13 Claims, 3 Drawing Figures

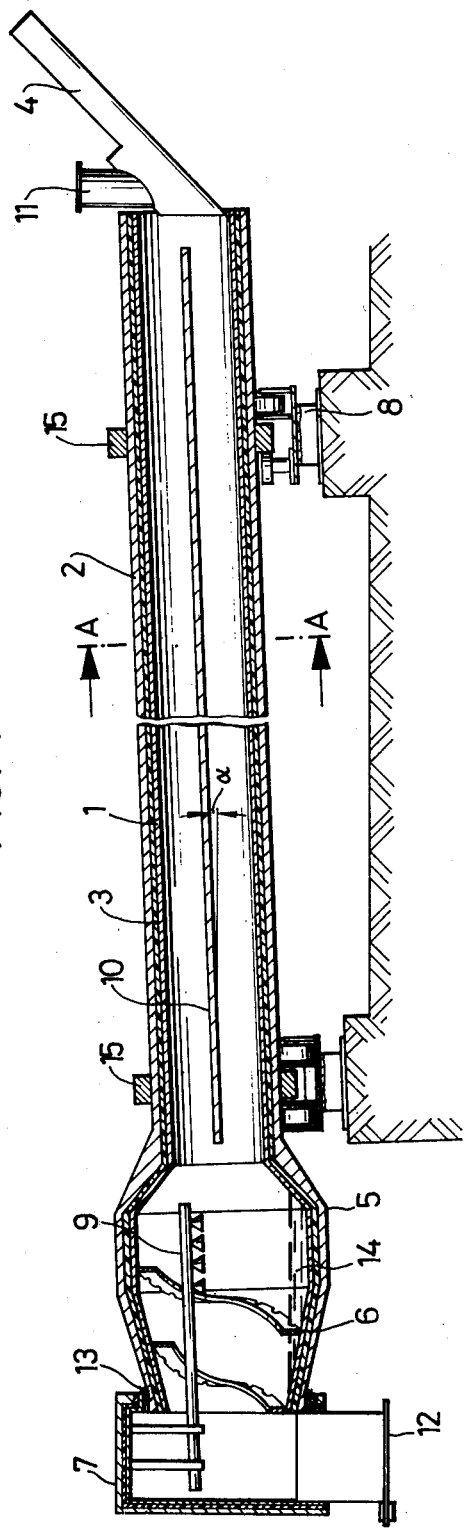
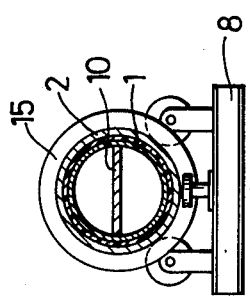

DEVICE FOR COOLING BULK MATERIAL BY LOW-BOILING LIQUEFIED GAS

BACKGROUND OF THE INVENTION

The invention relates to a device for the cooling of bulk material by low-boiling, liquefied gas in a precooling zone and in a spray zone. Such bulk material is scrap metal, for example, which is fed into a shredder. Such material may also be scrap tires or spices which are fed into a mill or may be rubber and plastic scraps.

The cooling of such bulk goods frequently takes place in cooling tunnels. Here, the bulk goods are poured onto a conveyer belt of steel and conducted through an insulated tunnel which is divided into a precooling zone and a spraying zone. The coolant, as a rule, is liquid nitrogen. In the precooling zone, cold nitrogen, vaporized on the conveyor belt, encounters the bulk goods. The bulk goods are cooled down thereby and reach the spraying zone at an already relatively low temperature. In the spraying zone, liquid nitrogen is sprayed on the goods, whereby they are cooled to the desired low temperature.

The use of such cooling tunnels for cooling bulk goods is relatively expensive. In particular the conveyer belt of austenitic steel is expensive.

In addition, prior practices have the drawback that, depending on the design, 20–30% of the heat of vaporization of the liquid nitrogen is transported into the warmth. Since the conveyer belts cannot be lubricated because of the low temperatures, they are subject to extensive wear, particularly in the joints. The cooling on the conveyor belt is uneven, furthermore, since the material, lying directly on the conveyer belt, remains warmer than that lying on top. Conveyer belts are indeed indispensable for sensitive goods, e.g. many foodstuffs, since mechanical damage to the goods by impacts and jolts is avoided. For crude goods, however, which may be poured, conveyer belts are too expensive.

A further area with which this invention is concerned is scrap tires. The disposal of the many millions of old tires accumulating each year presents an increasingly more difficult problem. Earlier, the old tires were stored in mill deposits. Because of the large quantity, this is possible only to a small extent. Furthermore, tires have a very long decomposition time. The hollow spaces resulting in storage have many disadvantages. These may be avoided if scrap tires are rendered into small pieces, the disintegration of the elastic material, however, already presenting considerable difficulties.

The burning of old tires is also difficult; however, in specially constructed installations, old tires may be burned satisfactorily. However, it is disadvantageous that the valuable tire material is completely destroyed.

A further possibility of destroying old tires consists of embrittling the old tires by a liquefied, low-boiling gas and subsequently to disintegrate them. For reasons of cost, nitrogen is considered above all as the low-boiling gas. The embrittled tires may relatively easily be rendered into small fragments or grains.

The steel inserts may then subsequently easily be removed. The valuable raw products are retained and may be further employed for various purposes.

In such practices the cooling takes place in that the tires are dipped into a bath of liquid nitrogen. It is disadvantageous here that a large quantity of nitorgen is used up, since in removing the tires from the nitrogen bath, liquid nitrogen remains in the hollow spaces in the tires and is lost, the nitrogen per se not being required for the embrittling of tires. A further disadvantage is the slow rate of travel in such baths. For an economical process, throughput quantities of at least 1000 pieces per hour are strived for, something which may be achieved by parallel-connecting several baths. This, however, is equivalent to a large investment of capital.

SUMMARY OF THE INVENTION

An object of the invention is to provide a device for the cooling of bulk goods by low-boiling, liquefied gas, wherein the division of the cooling run into a precooling and a spraying zone in the cooling tunnel is maintained but wherein the expensive conveyer belt is eliminated.

According to the invention, this object is achieved in that the precooling zone is in the shape of a rotary cylinder inclined slightly toward the horizontal and in the direction of the bulk goods discharge, to which is attached as the spraying and draining zone a drum-shaped chamber revolvable about its axis, the draining zone being constructed in the form of a worm conveyer.

In accordance with an advantageous design of this aspect of the invention, the rotary cylinder is divided by a concentric separating wall into two symmetrical halves. With the same filling capacity, a considerable increase of the exchange surface between cold gas and goods or cold wall and goods results thereby and consequently a decreased use of coolant due to the better heat transfer.

In a further advantageous design of the invention, the axis of the drum-shaped chamber has the same pitch as the rotary cylinder and is rigidly connected with the rotary cylinder. However, this need not be. The drum-shaped chamber may also be connected to the rotary cylinder only by means of sealing ring brushes. It is possible here to propel the rotary cylinder and the drum-shaped chamber at various rotational speeds.

It is advantageous in any case if the pitch of the worm conveyer is designed in such a manner that it conveys somewhat more than the rotary cylinder of the precooling zone. It is avoided with certainty thereby that an accumulation of material results in the spraying area. A further advantageous embodiment of the invention consists of having the maximum diameter of the drum-shaped chamber sufficiently large in order that a bath of liquefied gas may be maintained in the lowermost portion of the chamber.

A further object of the invention is to construct the spraying and discharge end in an optimum form for the cooling of scrap tires in a device for the embrittling of scrap tires by means of a low-boiling, liquefied gas consisting essentially of a rotary cylinder, slightly tilted toward the horizontal.

This object is achieved by a device for the embrittling of old tires by means of a low-boiling, liquefied gas which includes a rotary cylinder, slightly tilted toward the horizontal, whose higher positioned end constitutes the scrap tire inlet and whose lower positioned end serves as the scrap tire discharge. A spraying pipe for the liquefied gas provided with spray orifices protrudes into the scrap tire discharge, wherein, according to the invention, at least one ring is mounted on the inside wall of the rotary cylinder in the area between the spray orifices and the outlet opening of the rotary cylinder, whose thickness corresponds to the average tire thickness.

In an advantageous embodiment of the invention, the ring has an elliptic shape, i.e. the ring plane cuts the rotational axis of the rotary cylinder at a sharp angle.

The advantage of the invention is that at reasonably small cost, a certain closure is provided for the liquid gas collecting on the bottom of the rotary cylinder. The liquid gas cannot flow out from the low-positioned outlet end of the rotary cylinder because of the ring. At the same time, the ring acts as an obstacle for the tires, so that they accumulate before it. Above this accumulation is mounted the spraying pipe with the spray orifices. whereby particularly suitable conditions result from the cooling of the tires. In place of one ring, there may be arranged several rings in sequence. The rings then acts like an internal screw conveyer.

However, the tires may overcome the ring as a result of the rotation of the rotary cylinder. If the ring has an elliptical shape, it may be overcome by the tires even more easily, since then the tires at the bottom of the rotary cylinder are moved back by one increment with each revolution, slipping over the ring.

THE DRAWINGS

FIG. 1 is a longitudinal cross-sectional view through a novel device, wherein the rotary cylinder and the drum-shaped chamber are constructed in a rigid unit;

FIG. 2 is a cross-sectional view along the line A—A in FIG. 1; and

DETAILED DESCRIPTION

Figure 3:
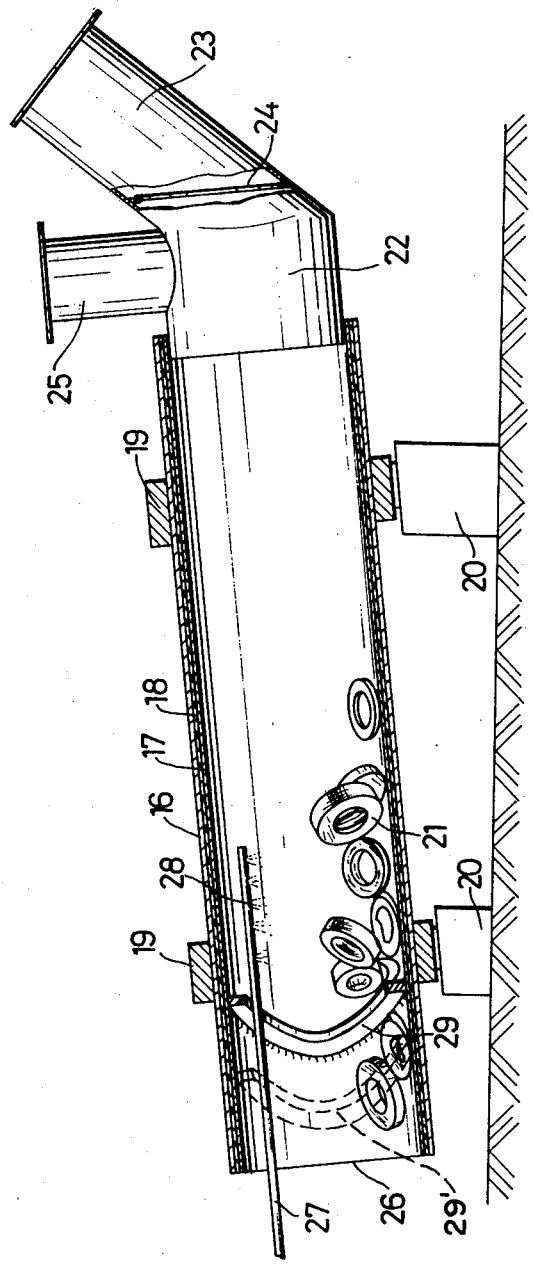
FIG. 3 is an elevation view of a further novel device for the embrittling of scrap tires.

In the device illustrated in FIGS. 1 and 2, the rotary cylinder serving as the precooling zone consists of a cylindrical internal pipe 1 of low-temperature-resistant steel. Pipe 1 is surrounded by an external pipe 2 of steel. The space between the two pipes is filled with insulation material 3, e.g. PVC hard foam or slag wool. Arranged in the inside pipe 1 is a separating wall 10, whereby the inside pipe 1 is divided into two equal chambers. In place of the separating wall 10, carrier cams may also be mounted on the inside pipe 1, effecting a thorough mixing of the cooling goods.

The cooling goods are poured through a chute 4 into the rotary cylinder. Situated on the chute 4 is a suction column 11 for the vaporized nitrogen. The rotary cylinder is supported in two roller blocks 8 and two treads 15 at an angle with a pitch toward the outlet 7 for the goods.

Attached to the rotary cylinder is a drum-shaped chamber 5 as the spraying and draining zone. The drum-shaped chamber consists of a frusto-conical section which merges into a cylindrical part.

At the downstream end of the cylindrical part, a further frusto-conical part is connected as the drawing zone, which is formed as worm conveyer 6. Protruding into the drum-shaped chamber is spraying device 9, by means of which liquid nitrogen is sprayed on the goods. In the lowermost portion of the drum-shaped chamber, a bath 14 of liquid nitrogen may be provided. The passable or removable cooling goods outlet 7 with self-activating nitrogen closure 12 is sealed from the frusto-conical tapering of the drum-shaped chamber by means of a multi-layer ring brush 13 with brass or bronze bristles. A temperature measurement of the vaporized nitrogen may be undertaken in the area of the cooling goods outlet 7 or in the area of suction column 11.

In operation, the rotary cylinder is brought into rotation by roller blocks 8 provided with a controllable drive. The bulk goods reach the rotary cylinder by means of chute 4. The pitch and the rotation of the rotary cylinder effect the movement of the bulk goods in the direction of the spraying zone. Due to the relatively small diameter of inner pipe 1, the gas speed in both rotary cylinder halves is great, so that good heat exchange factors may be achieved and the preceptible coolness of the nitrogen may be utilized well.

After passing the precooling zone, the cooled goods slide into the spraying zone. In comparison to the precooling zone, this zone is widened like a drum in order to prevent a possibly excessively sprayed nitrogen from being lost in the direction of outlet 7. In addition, the spraying zone may also be utilized as a nitrogen bath for the cooling goods. By means of worm conveyer 6 in the spraying zone, the cooled bulk goods may be conveyed to the outlet 7, and from there, they go to further processing through the self-activating nitrogen closure 12. In order that no accumulation of goods results in the spraying zone, the pitch of the worm conveyer 6 is designed in such a manner that it conveys somewhat more than the rotary cylinder of the precooling zone.

FIG. 3 illustrates a device for the embrittling of scrap tires. This device consists of a rotary cylinder, which is formed by an outside pipe 16 and an inside pipe 17, between them being situated insulation 18. The rotational axis of the rotary cylinder is at a slight incline towards the horizontal. Mounted on the outside pipe 16 are mounted treads 19, which are supported in roller blocks 20. The drive for the rotary cylinder is not illustrated.

At the higher placed end of the rotary cylinder, the admission of the scrap tires 21 takes place by means of a stationary charging device 22. The charging device 22 consists of an input shaft 23, a flap 24 acting as a gas closure, and an exhaust channel 25 for the vaporized liquid gas.

In the lower placed discharge opening 26 of the rotary cylinder protrudes a spray pipe 27 with spray orifices 28. The source of the liquid gas which flows into spray pipe 27 is not illustrated. In the area between the rotary cylinder outlet opening 26 and the spay orifices 28, according to the invention, there is mounted an ellipitic ring 29 on the inside pipe 17. Ring 29 serves in an already illustrated manner as a closure for the liquid gas, possibly accumulating at the bottom of the rotary cylinder and effects an accumulation of the scrap tires 21 under spray orifices 28. Because of its elliptic shape, it furthermore acts as an inside screw conveyer, so that the scrap tires may easily slide over the ring in thrusts. As previously indicated the invention may be practiced with several rings in sequence. FIG. 3 illustrates in phantom one such additional ring 29'.

What is claimed is:

1. In a device for the cooling of bulk material by low-boiling, liquefied gas in a precooling zone and a spraying zone, characterized in that the precooling zone is cylindrically shaped and inclined downwardly toward its discharge end, means for rotating said precooling zone about its longitudinal axis, said spraying zone being connected to and in flow communication with said discharge end of said precooling zone, said spraying zone being a drum-shaped chamber, means for rotating said chamber about its axis, spraying means in said chamber, a draining zone in said chamber, worm conveyor means in said draining zone, and said precooling cylinder being divided longitudinally into two symmetrical halves by a separating wall disposed along its longitudinal axis.

2. In the device of claim 1 wherein said chamber has a larger diameter prior to its discharge end than at its discharge end to maintain a bath of the liquefied gas at its bottom-most larger diameter portion thereof.

3. In the device of claim 2 wherein said chamber is inclined toward its discharge end at the same angle as said precooling zone.

4. In the device of claim 3 wherein said chamber and precooling zone are integral.

5. In the device of claim 4 wherein said chamber includes an outwardly extending frusto-conical section connected to said precooling zone, a cylindrical section connected to said outwardly extending frusto-conical section downstream therefrom, an inwardly extending frusto-conical section connected to said cylindrical section downstream therefrom, and said worm conveyor being mounted on the inner wall of said inwardly extending frusto-conical section and extending into said cylindrical section.

6. In the device of claim 1 wherein said chamber is inclined toward its discharge end at the same angle as said precooling zone.

7. In the device of claim 1 wherein said chamber and precooling zone are integral.

8. In the device of claim 1 wherein said chamber includes an outwardly extending frusto-conical section connected to said precooling zone, a cylindrical section connected to said outwardly extending frusto-conical section downstream therefrom, an inwardly extending frusto-conical section connected to said cylindrical section downstream therefrom, and said worm conveyor being mounted on the inner wall of said inwardly extending frusto-conical section and extending into said cylindrical section.

9. In a device for the embrittling of objects by means of low-boiling liquefied gas in a precooling zone and a spraying zone, characterized in that the precooling zone is inclined downwardly toward its discharge end and is cylindricaly shaped, means for rotating said precooling zone about its longitudinal axis, said spraying zone connected to and in flow communication with said discharge end of said precooling zone, means for rotating said spraying zone, a spray pipe mounted in said spraying zone through its discharge end, said spray pipe having spray orifices for directing liquefied gas against the objects approaching said discharge end, a closed endless ring mounted on the interior wall of said spraying zone and projecting therein at a location between said discharge end and said spraying orifices and said ring comprising dam means for maintaining the liquid gas therein and further comprising obstruction means for retarding discharge of the objects therefrom.

10. In the device of claim 9 wherein said ring is elliptically shaped mounted to said wall at an angle to the longitudinal axis of said spraying zone.

11. In the device of claim 9, in combination therewith, a plurality of scrap tires being treated, said tires being in said device, and said ring having a thickness corresponding to the average thickness of said tires.

12. In the device of claim 11 wherein said precooling zone and said spraying zone are integral.

13. In the device of claim 9 wherein a plurality of said rings are mounted on said wall.

* * * * *